United States Patent
Fujii et al.

(10) Patent No.: US 11,343,963 B2
(45) Date of Patent: May 31, 2022

(54) STAND-ON LAWNMOWER

(71) Applicant: KUBOTA CORPORATION, Osaka (JP)

(72) Inventors: Yuto Fujii, Sakai (JP); Justin McCallister, Cleveland, GA (US)

(73) Assignee: KUBOTA CORPORATION, Osaka (JP)

( * ) Notice: Subject to any disclaimer, the term of this patent is extended or adjusted under 35 U.S.C. 154(b) by 124 days.

(21) Appl. No.: 16/407,851

(22) Filed: May 9, 2019

(65) Prior Publication Data
US 2020/0352098 A1    Nov. 12, 2020

(51) Int. Cl.
| | | |
|---|---|---|
| *A01D 34/82* | (2006.01) | |
| *B62D 51/02* | (2006.01) | |
| *A01D 34/69* | (2006.01) | |
| *A01D 101/00* | (2006.01) | |

(52) U.S. Cl.
CPC ............ *A01D 34/82* (2013.01); *B62D 51/02* (2013.01); *A01D 34/69* (2013.01); *A01D 2101/00* (2013.01)

(58) Field of Classification Search
CPC .. A01D 34/82; A01D 2101/00; A01D 34/001; B62D 51/02
See application file for complete search history.

(56) References Cited

U.S. PATENT DOCUMENTS

| | | | | |
|---|---|---|---|---|
| 2,059,848 A | * | 11/1936 | Cavitt | B60N 2/38 248/583 |
| 2,799,323 A | * | 7/1957 | Berg | A47C 3/025 297/312 |
| 5,367,864 A | * | 11/1994 | Ogasawara | A01D 34/64 180/900 |
| 5,579,859 A | * | 12/1996 | Quellhorst | B62D 33/0604 180/89.13 |
| 5,613,690 A | * | 3/1997 | McShane | A63B 22/18 273/449 |
| 6,443,252 B1 | * | 9/2002 | Andes | A61G 5/10 180/65.1 |
| 6,490,849 B1 | * | 12/2002 | Scag | A01D 34/001 56/10.8 |
| 6,499,282 B1 | * | 12/2002 | Velke | A01D 34/6806 56/14.7 |
| 6,719,258 B2 | * | 4/2004 | Bryngelson | B60N 2/502 248/419 |

(Continued)

FOREIGN PATENT DOCUMENTS

JP     09025997 A  *  1/1997

*Primary Examiner* — Thomas B Will
*Assistant Examiner* — Madeline I Runco
(74) *Attorney, Agent, or Firm* — Greenblum & Bernstein, P.L.C.

(57) ABSTRACT

A stand-on lawnmower includes a vehicle body frame, a steering mechanism operable for maneuvering the lawnmower, and a platform assembly for an operator operating the steering mechanism. The platform assembly includes a stationary base mounted to the vehicle body frame, a platform supported to the stationary base and a swing mechanism provided between the stationary base and the platform. In the platform, a footrest face for the operator is formed. The swing mechanism includes a rolling mechanism for causing rolling of the footrest face and a pitching mechanism for causing pitching of the footrest face.

13 Claims, 3 Drawing Sheets

(56) References Cited

U.S. PATENT DOCUMENTS

| | | | | |
|---|---|---|---|---|
| 6,773,049 | B2* | 8/2004 | Rupiper | B60N 2/06 |
| | | | | 296/63 |
| 7,174,976 | B2* | 2/2007 | Kamen | A63C 17/01 |
| | | | | 180/19.1 |
| 7,712,751 | B2* | 5/2010 | Beal | A01D 34/001 |
| | | | | 280/32.7 |
| 8,141,886 | B1* | 3/2012 | Sugden | A01D 34/82 |
| | | | | 280/32.5 |
| 8,186,475 | B2* | 5/2012 | Sugden | B60N 2/544 |
| 8,454,032 | B2* | 6/2013 | Havener | A01D 34/824 |
| | | | | 280/32.7 |
| 8,844,657 | B2* | 9/2014 | Clark | A01D 34/82 |
| | | | | 180/6.32 |
| 9,216,764 | B2* | 12/2015 | Ito | B62D 11/04 |
| 9,545,963 | B2* | 1/2017 | Kamen | B60G 11/14 |
| 9,656,688 | B2* | 5/2017 | Ying | B62D 51/02 |
| 9,731,760 | B2* | 8/2017 | Ito | B62D 51/001 |
| 9,889,894 | B2* | 2/2018 | Lohmann | B62D 51/00 |
| 10,091,936 | B2* | 10/2018 | Laurin | B60T 7/12 |
| 10,112,645 | B2* | 10/2018 | Ito | A01D 69/02 |
| 2007/0155495 | A1* | 7/2007 | Goo | A63B 69/0093 |
| | | | | 463/36 |
| 2009/0140501 | A1* | 6/2009 | Taylor | B60G 21/06 |
| | | | | 280/5.508 |
| 2009/0203441 | A1* | 8/2009 | Piccoli | A63F 13/06 |
| | | | | 463/36 |
| 2010/0312154 | A1* | 12/2010 | Becker | A61H 23/0218 |
| | | | | 601/49 |
| 2011/0260502 | A1* | 10/2011 | Yahner | B66F 9/0759 |
| | | | | 296/190.07 |
| 2015/0359702 | A1* | 12/2015 | Rubin | A61H 5/005 |
| | | | | 601/78 |

* cited by examiner

STAND-ON LAWNMOWER

TECHNICAL FIELD

The present invention relates to a stand-on lawnmower configured such that an operator, while standing (standing-on), carries out a lawn mowing work.

BACKGROUND ART

A stand-on lawnmower includes a vehicle body frame supported on the ground surface via wheel units, a mower unit mounted to the vehicle body frame, a steering mechanism operable for maneuvering the lawnmower, and a platform on which an operator operating the steering mechanism stands.

A stand-on lawnmower according to U.S. Pat. No. 6,490,849 includes a platform which is mounted to a rear frame via a plurality of coil springs. This platform arrangement provides comfortable riding feel for the operator standing on the platform with reduced bouncy ride. This platform has no pivot (swing) shaft, but can be tilted omnidirectionally relative to the horizontal plane, thanks to the coil springs provide in distribution over the horizontal face of the platform. With the effect provided by the plurality of coil springs, transmission of small vibrations caused ty to e.g. road surface undulations to the operator is suppressed. In the course of traveling on a sloped road surface, the lawnmower will be tilted in either a vehicle body transverse direction or a vehicle body longitudinal direction, so the platform too will be tilted correspondingly. On the other hand, this platform arrangement allowing tilting in the entire circumferential direction can invite swaying of the platform, which makes it difficult for the operator to keep his/her body balance at time of sloped road surface traveling.

A stand-on lawnmower disclosed in U.S. Pat. No. 8,141,886 includes a platform which is supported to a vehicle body frame via a suspension assembly. This platform can pivot about a pivot shaft extending in a vehicle body transverse direction, thus damping its vibration (pitching). Namely, this platform allows only its pitching, not its rolling, relative to the vehicle body frame. With this platform, in a sloped road surface traveling, an operator standing on the platform will be required to keep body balance by changing his/her posture.

SUMMARY OF THE INVENTION

In view of the above-described state of the art, there is a need for a stand-on lawnmower having an improved platform arrangement that allows an operator standing on the platform to keep his/her posture straight in both traveling on a sloped road surface along a vehicle body transverse direction (transverse traveling) and traveling (ascending and descending) on a sloped road surface along a vehicle body longitudinal direction.

A stand-on lawnmower according to the present invention comprises a vehicle body frame, a wheel unit supporting the vehicle body frame on the ground surface, a power source mounted on the vehicle body frame, a mower unit mounted on the vehicle body frame, a steering mechanism operable for maneuvering the lawnmower, and a platform assembly for an operator operating the steering mechanism. The platform assembly includes a stationary base mounted to the vehicle body frame, a platform supported to the stationary base, and a swing mechanism provided between the stationary base and the platform. In the platform, there is formed a footrest face for the operator. The swing mechanism includes a rolling mechanism for causing rolling of the footrest face and a pitching mechanism for causing pitching of the footrest face.

With use of this platform assembly, when the vehicle body travels on a road surface tilted or sloped in the vehicle body longitudinal direction, pitching of the platform allows the operator to stand on the platform under a stable posture. Moreover, in the course of straight traveling on a road surface tilted or sloped in the vehicle body transverse direction, pitching of the platform allows the operator to stand on the platform under a stable posture. Thus, in both the case of traveling on a sloped face in the vehicle body transverse direction and the case of traveling on a sloped face in the vehicle body longitudinal direction, physical burden on the operator is reduced.

In pitching and/or rolling of the platform, if its vibration occurs excessively, this results in excessive swaying of the operator's body, making stable maneuvering difficult. In order to suppress such vibration (pitching and/or rolling), a damper (pitching damper and/or rolling damper) can be employed advantageously.

Then, according to an advantageous embodiment of the swing mechanism for realizing the pitching and the rolling of the platform, the swing mechanism includes an intermediate member, the pitching mechanism includes a pitching shaft for causing pitching of the stationary base relative to the intermediate member, and the rolling mechanism includes a rolling shaft for causing rolling of the platform relative to the intermediate member. Further, in case a pitching damper and a rolling damper are employed, a damping coefficient of the rolling damper is set higher than a damping coefficient of the pitching damper. With this, a comfortable lawn mowing traveling can be realized.

Some of vibrations transmitted from a road surface to the platform are difficult to be absorbed by such dampers. For instance, it is difficult for the dampers to suppress all vibrations occurring in the course of traveling on a horizontal uneven road surface. To solve this problem, a coil spring for suppressing the pitching and/or the rolling can be used advantageously, in addition to the dampers.

DETAILED DESCRIPTION

Next, one embodiment of a stand-on lawnmower (to be referred to simply as "mower" hereinafter) relating to the present invention will be explained with reference to the accompanying drawings. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
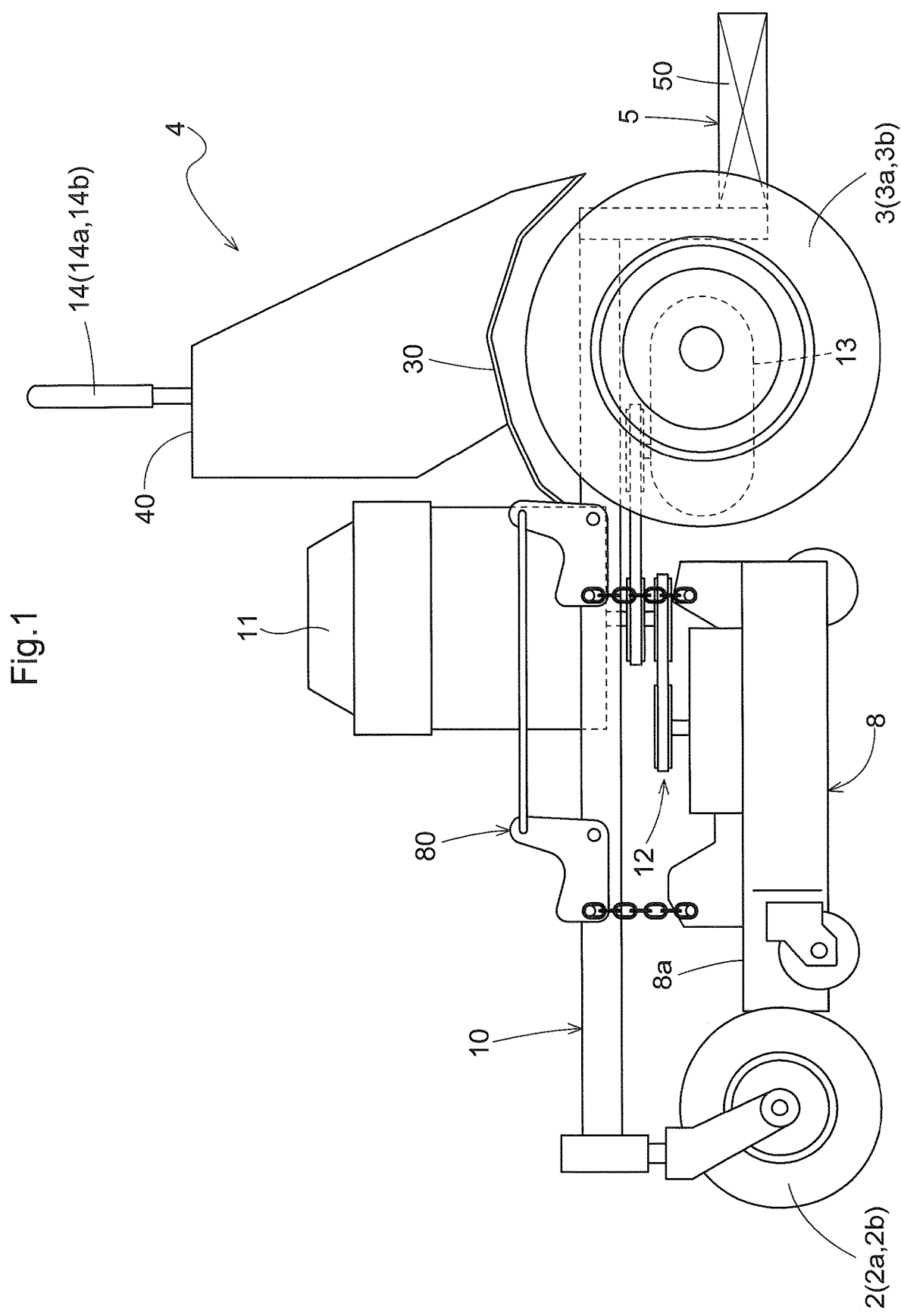
FIG. 1 is a side view of a stand-on lawnmower.

As shown in FIG. 1, this mower includes a vehicle body frame 10 supported on the ground surface by a front wheel unit 2 and a rear wheel unit 3. The front wheel unit 2 is configured as caster wheel. This mower is configured as a so-called "zero-turn mower" whose rear wheel unit 3 includes a left rear wheel 3a and a right rear wheel 3b (see FIG. 2), that are adjustable in their forward and reverse speeds independently of each other. The front wheel unit 2 includes a left front wheel 2a and a right front wheel 2b. The vehicle body frame 10 includes a pair of left and right longitudinal frames extending in the vehicle body front/rear direction and a cross beam extending in the vehicle body transverse direction to interconnect the longitudinal frames, with these frames being formed of angular pipes or plate members. Between the front wheel unit 2 and the rear wheel unit 3, a mower unit 8 is suspended from the vehicle body frame 10 via a lift mechanism 80.

At a center portion of the vehicle body frame 10, an engine 11 as an internal combustion engine for use as a power source is mounted together with engine accessories. Power from this engine 11 is fed to the rear wheel unit 3 via a traveling transmission mechanism 13 which per se is known. Further, power from the engine 11 is fed also to the mower unit 8 via a PTO transmission mechanism 12 which also per se is known.

The mower unit 8 includes a mower deck 8a of a side discharge type and one or more horizontal rotary blades which is/are disposed in an internal space of the mower deck 8a.

Rearwardly of the engine 11 and on the vehicle body frame 10, a maneuvering section 4 is disposed. This maneuvering section 4 includes a maneuvering panel 40 providing a function as a console box of the maneuvering section 4. On the maneuvering panel 40, there is mounted a steering mechanism 14 for steering the mower. In the periphery of the maneuvering panel 40, there are disposed various user operational devices. Further, under left and right panels which together constitute the maneuvering panel 40, there are mounted fenders 30 for the rear wheel unit 3.

Figure 2:
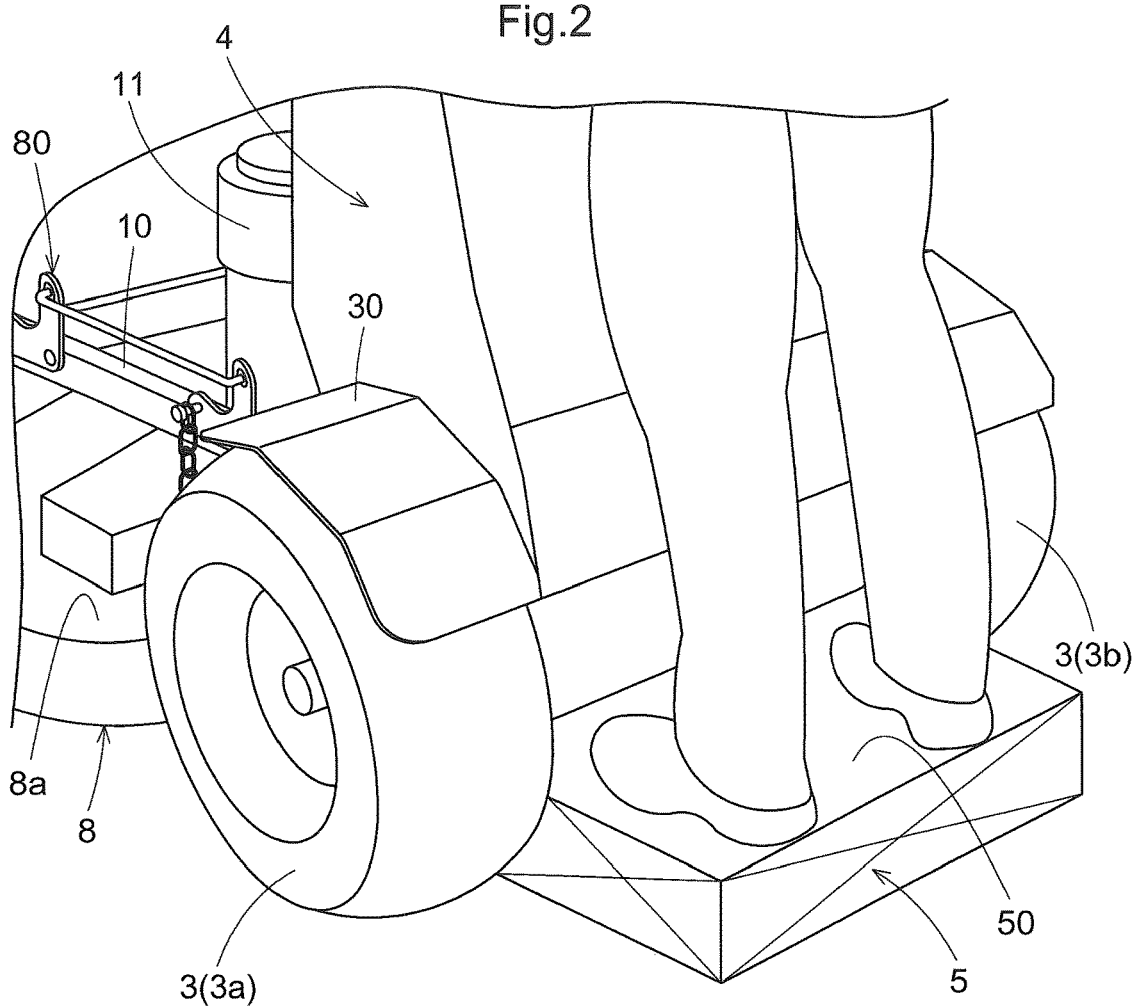
FIG. 2 is a perspective view showing a platform assembly included in the stand-on lawnmower.

As shown in FIG. 2, rearwardly of the maneuvering section 4 and at the rear end of the vehicle body frame 10, a platform assembly 5 is attached. The user operational devices are operated by an operator who stands on this platform assembly 5.

The steering mechanism 14 includes a left maneuvering lever 14a and a right maneuvering lever 14b as user operational devices. Incidentally, in FIG. 1, the right maneuvering lever 14b is not visible in the illustration as being concealed by the left maneuvering lever 14a. The left maneuvering lever 14a is used for adjusting a rotational speed of the left rear wheel 3a. The right maneuvering lever 14b is used for adjusting a rotational speed of the right rear wheel 3b. The left maneuvering lever 14a and the right maneuvering lever 14b are pivotable over/across a forward traveling speed changing range, a neutral and a rear traveling speed changing range.

The traveling transmission mechanism 13 includes a pair of left and right HST's (hydrostatic transmission) not shown. Power from the engine 11 is transmitted via this transmission to the left rear wheel 3a and the right rear wheel 3b independently. Speeds (speed ratios) including forward traveling, rear traveling and neutral are adjusted based on pivotal operations on the left maneuvering lever 14a and the right maneuvering lever 14b. More particularly, in response to user operations on the left maneuvering lever 14a and the right maneuvering lever 14b, there are realized a stopped state, a straight traveling state, a gentle turning state, a pivot turning state and a spin turning state, respectively. The stopped state is realized by stopping the left rear wheel 3a and the right rear wheel 3b. The straight traveling state is realized by driving the left rear wheel 3a and the right rear wheel 3b together at an equal speed forwardly or reversely. The gentle turning state is realized by driving the left rear wheel 3a and the right rear wheel 3b at different speeds from each other forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other reversely.

In FIG. 1 and FIG. 2, the platform assembly 5 is shown as a box whose contour alone is shown. In fact, its upper face is formed as a footrest face 50.

Figure 3:
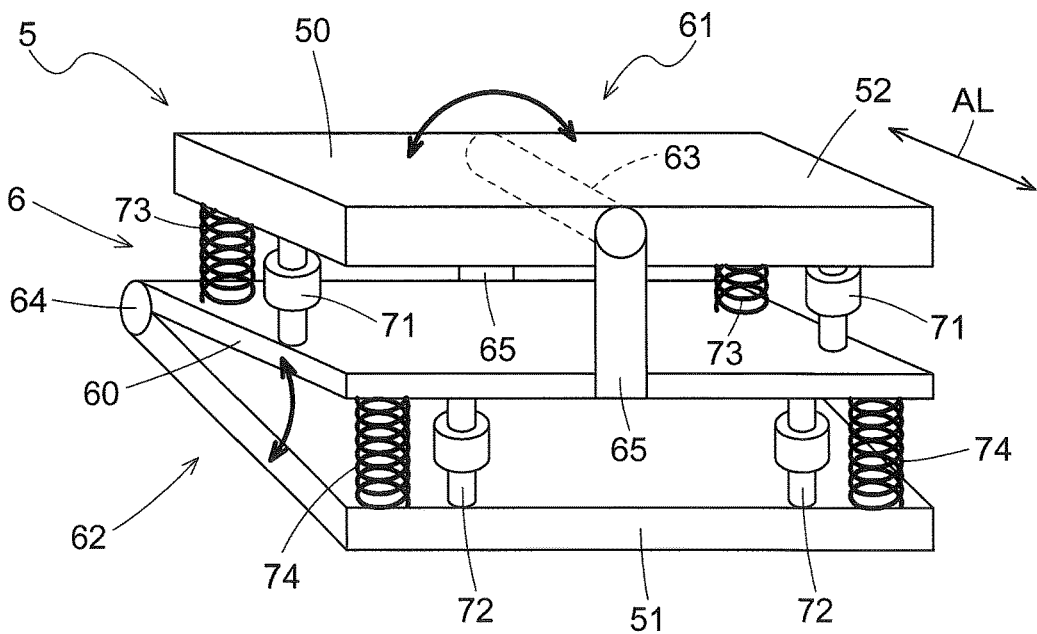
FIG. 3 is a schematic view showing a basic arrangement of the platform assembly.

FIG. 3 schematically shows the basic configuration of the platform assembly 5. The platform assembly 5 includes a plate-like stationary base 51 attached to a rear portion of the vehicle body frame 10, a plat-like platform 52 supported to the stationary base 51 upwardly of this stationary base 51, and a swing mechanism 6 provided between the stationary base 51 and the platform 52. The footrest face 50 is provided in the upper face of the stationary base 51. Incidentally, an arrow AL shown in FIG. 3 represents the vehicle body front/rear direction (vehicle body straight traveling direction).

The swing mechanism 6 includes a rolling mechanism 61 for causing rolling of the footrest face 50 and a pitching mechanism 62 for causing pitching of the footrest face 50. The swing mechanism 6 further includes a plate-like intermediate member 60 disposed between the stationary base 51 and the platform 52. Namely, the stationary base 51, the intermediate member 60 and the platform 52 are superposed one on another in three stages in the vertical direction.

The rolling mechanism 61 includes a rolling shaft 63 for causing rolling of the platform 52 relative to the intermediate member 60. The rolling shaft 62 is attached to the platform 52 and the axis of this rolling shaft 63 extends in the vehicle body front/rear direction (vehicle body traveling direction). In the instant embodiment, the rolling shaft 63 of the rolling mechanism 51 is supported to front and rear two brackets 65 that are fixed to the intermediate member 60.

Between the platform 52 and the intermediate member 60, there are provided two rolling dampers 71 for suppressing rolling and two first coil springs 73 for resisting the rolling. The rolling dampers 71 and the first coil springs 73 can be formed integral with each other.

The pitching mechanism 62 includes a pitching shaft 64 for causing pitching of the intermediate member 60 relative to the stationary base 51. The axis of this pitching shaft 64 extends in the vehicle body transverse direction (perpendicular to the axis of the rolling shaft 63). In the instant embodiment, the pitching mechanism 62 pivotally connects the front edge of the stationary base 51 with the front edge of the intermediate member 60 or the rear edge of the stationary base 51 with the rear edge of the intermediate member 60.

Between the stationary base 51 and the intermediate member 60, there are provided two pitching dampers 72 for suppressing pitching and two second coil springs 74 for resisting the pitching. The pitching dampers 72 and the second coil springs 74 can be formed integral with each other.

The respective rolling dampers 71 employed here have a higher damping coefficient than a damping coefficient of the respective pitching dampers 72. Further, the respective first coil springs 73 employed here have a spring force which is equal to or stronger than a spring force of the respective second coil springs 74. These arrangements allow the operator to easily keep the platform 52 horizontal on a sloped road surface while effectively suppressing uncontrolled wobbling of the platform 52 due to rolling. Namely, the rolling dampers 71 generate high reaction force against an instantaneous external force, thus suppressing uncontrolled wobbling of the platform 52. On the other hand, the rolling dampers 71 generate low reaction fore in response to a constant external force generated on a sloped land, thus allowing the operator to roll the platform 52.

In the platform assembly 5 schematically shown in FIG. 3, the rolling mechanism 61 and the pitching mechanism 62 are incorporated between the stationary base 51 and the platform 52, so that rolling and pitching of the platform 52 relative to the stationary base 51, namely the vehicle body frame 10, are made possible. In this, the rolling mechanism 61 and the pitching mechanism 62 are overlapped in the perpendicular direction, with the rolling mechanism being disposed on the upper side and the pitching mechanism 62 being disposed on the lower side.

Figure 4:
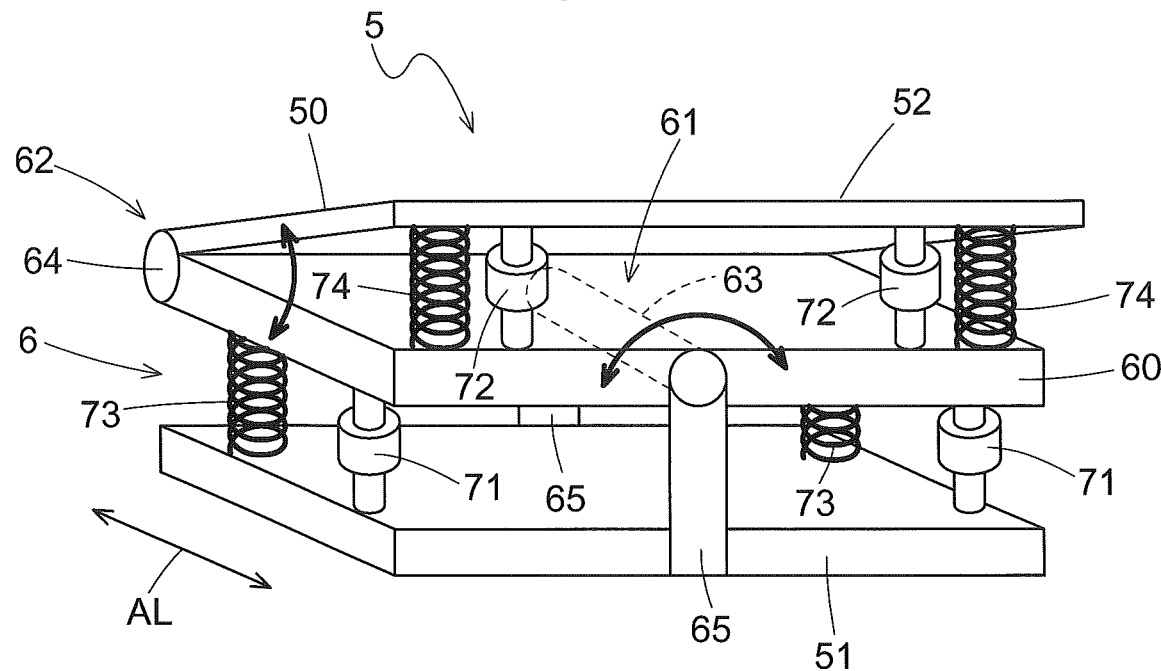
FIG. 4 is a schematic view showing a basic arrangement of the platform assembly relating to a further embodiment.

A different configuration of the platform assembly 5 is shown in FIG. 4. With this platform assembly 5, similarly to the platform assembly 5 shown in FIG. 3, the rolling mechanism 61 and the pitching mechanism 62 are overlapped in the perpendicular direction. However, in the case of the platform assembly 5 shown in FIG. 4, the pitching mechanism 62 is disposed on the upper side and the rolling mechanism 61 is disposed on the lower side. Incidentally, an arrow AL shown in FIG. 4 represents the vehicle body front/rear direction (vehicle body straight traveling direction).

In the foregoing embodiment, there is employed a mower using the engine 11 (an internal combustion engine such as a gasoline engine, a diesel engine, etc.) as a power source. Alternatively, the mower can be configured as an electrically powered mower using an electric motor and a battery as the power source, instead of the engine 11. Further alternatively, the mower can be configured a hybrid mower using the engine 11 in combination with a generator and an electric motor.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A stand-on lawnmower comprising:
a vehicle body frame having a vehicle body front/rear direction;
a wheel unit supporting the vehicle body frame on the ground surface;
a power source mounted on the vehicle body frame;
a mower unit mounted on the vehicle body frame;
a steering mechanism configured to maneuver the lawnmower; and
a platform assembly for an operator operating the steering mechanism, the platform assembly including:
a stationary base fixed to the vehicle body frame,
a platform supported by the stationary base, wherein a footrest face for the operator is formed in the platform, and
a swing mechanism provided between the stationary base and the platform, the swing mechanism including a rolling mechanism configured to allow rolling of the footrest face and a pitching mechanism configured to allow pitching of the footrest face,
wherein the swing mechanism includes an intermediate member disposed between the footrest face and the stationary base, the intermediate member having a peripheral edge, wherein the intermediate member is pivotally connected to either the footrest face or the stationary base along the peripheral edge transverse to the vehicle body front/rear direction, and
the intermediate member pivots about the peripheral edge transverse to the vehicle front/rear direction.

2. The stand-on lawnmower of claim 1, wherein:
the pitching mechanism includes a pitching shaft configured to allow pitching the intermediate member relative to the stationary base; and
the rolling mechanism includes a rolling shaft configured to allow rolling of the platform relative to the intermediate member.

3. The stand-on lawnmower of claim 2, wherein:
the rolling mechanism includes a rolling damper configured to suppress rolling and the pitching mechanism includes a pitching damper configured to suppress pitching; and a damping coefficient of the rolling damper is set higher than a damping coefficient of the pitching damper.

4. The stand-on lawnmower of claim 3, wherein:
a first coil spring configured to suppress rolling is provided between the intermediate member and the platform; and a second coil spring configured to resist pitching is provided between the stationary base and the intermediate member.

5. The stand-on lawnmower of claim 4, wherein the first coil spring has a spring force stronger than a spring force of the second coil spring.

6. The stand-on lawnmower of claim 1, wherein:
the rolling mechanism includes a rolling shaft configured to allow rolling of the intermediate member relative to the stationary base; and
the pitching mechanism includes a pitching shaft configured to allow pitching of the platform relative to the intermediate member.

7. The stand-on lawnmower of claim 6, wherein:
the rolling mechanism includes a rolling damper configured to suppress rolling and the pitching mechanism includes a pitching damper configured to suppress pitching; and
a damping coefficient of the rolling damper is set higher than a damping coefficient of the pitching damper.

8. The stand-on lawnmower of claim 7, wherein:
a first coil spring configured to suppress rolling is provided between the intermediate member and the platform; and a second coil spring configured to resist pitching is provided between the stationary base and the intermediate member.

9. The stand-on lawnmower of claim 1, wherein the intermediate member is a planar intermediate member disposed between the footrest face and the stationary base, the planar intermediate member extending from a front edge to a rear edge, wherein the peripheral edge is either the front edge or the rear edge.

10. A stand-on lawnmower comprising:
a vehicle body frame extending longitudinally from a front to a rear;
a wheel unit supporting the vehicle body frame on the ground surface;
a power source mounted on the vehicle body frame;
a mower unit mounted on the vehicle body frame;
a steering mechanism configured to maneuver the lawnmower; and
a platform assembly for an operator operating the steering mechanism, the platform assembly including:
a stationary base mounted to the vehicle body frame,
a platform supported to the stationary base, wherein a footrest face for the operator is formed in the platform and
a swing mechanism provided between the stationary base and the platform, the swing mechanism including a rolling mechanism configured to allow rolling of the footrest face and a pitching mechanism configured to allow pitching of the footrest face,
wherein the swing mechanism includes a planar intermediate member disposed between the footrest face and the stationary base, the planar intermediate member having a peripheral edge, wherein the planar intermediate member is pivotally connected to either the footrest face or the stationary base along the peripheral edge, and
the planar intermediate member pivots about the peripheral edge transverse to the vehicle front/rear direction.

11. A stand-on lawnmower comprising:
a vehicle body frame extending longitudinally from a front to a rear;
a wheel unit supporting the vehicle body frame on the ground surface;
a power source mounted on the vehicle body frame;
a mower unit mounted on the vehicle body frame;
a steering mechanism configured to maneuver the lawnmower; and
a platform assembly for an operator operating the steering mechanism, the platform assembly including:
a stationary base mounted to the vehicle body frame,
a platform supported to the stationary base and disposed over the stationary base, wherein a footrest face for the operator is formed in the platform, and
a swing mechanism provided between the stationary base and the platform, the swing mechanism including a rolling mechanism configured to allow rolling of the footrest face and a pitching mechanism configured to allow pitching of the footrest face,
wherein the swing mechanism includes an intermediate member disposed under the platform extending from a front edge to a rear edge, wherein the intermediate member is pivotally connected to either the footrest face or the stationary base along either the front edge or the rear edge in a direction transverse to a longitudinal axis of the vehicle body, and
the intermediate member pivots about the peripheral edge transverse to the vehicle front/rear direction.

12. The stand-on lawnmower according to claim 11, wherein the pitching mechanism includes a pitching shaft connecting the front edge or rear edge of the intermediate member to the stationary base, the pitching shaft being configured to allow pitching of the intermediate member relative to the stationary base; and the rolling mechanism includes a rolling shaft configured to allow rolling of the platform relative to the intermediate member.

13. The stand-on lawnmower according to claim 11, wherein the rolling mechanism includes a rolling shaft configured to allow rolling of the intermediate member relative to the stationary base; and the pitching mechanism includes a pitching shaft connecting the front edge or rear edge of the intermediate member to the platform, wherein the pitching shaft is configured to allow pitching of the platform relative to the intermediate member.

* * * * *